United States Patent
Ito

(10) Patent No.: US 10,703,862 B2
(45) Date of Patent: Jul. 7, 2020

(54) AROMATIC POLYSULFONE COMPOSITION AND MOLDED ARTICLE

(71) Applicant: Sumitomo Chemical Company, Limited, Tokyo (JP)

(72) Inventor: Kazuyuki Ito, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 8 days.

(21) Appl. No.: 16/075,802

(22) PCT Filed: Feb. 9, 2017

(86) PCT No.: PCT/JP2017/004709
§ 371 (c)(1),
(2) Date: Aug. 6, 2018

(87) PCT Pub. No.: WO2017/138600
PCT Pub. Date: Aug. 17, 2017

(65) Prior Publication Data
US 2019/0062506 A1 Feb. 28, 2019

(30) Foreign Application Priority Data

Feb. 10, 2016 (JP) .................. 2016-023700
Jul. 14, 2016 (JP) .................. 2016-139738

(51) Int. Cl.
| C08G 75/23 | (2006.01) |
|---|---|
| C08L 81/06 | (2006.01) |
| C08K 5/3415 | (2006.01) |
| C08L 71/00 | (2006.01) |
| C08G 65/40 | (2006.01) |

(52) U.S. Cl.
CPC ......... C08G 75/23 (2013.01); C08G 65/4056 (2013.01); C08K 5/3415 (2013.01); C08L 71/00 (2013.01); C08L 81/06 (2013.01)

(58) Field of Classification Search
CPC ....... C08J 2381/06; C08J 5/18; C08G 75/205; C08G 75/23; C08G 65/40; G01N 2030/486; C08L 81/06
See application file for complete search history.

(56) References Cited

U.S. PATENT DOCUMENTS

| 2011/0224386 A1 | 9/2011 | Weber et al. |
|---|---|---|
| 2012/0149796 A1 | 6/2012 | Weber et al. |
| 2015/0119485 A1 | 4/2015 | Weber et al. |
| 2015/0129487 A1* | 5/2015 | Bhatnagar .............. C08G 75/23 210/493.5 |
| 2016/0159990 A1 | 6/2016 | Erbes et al. |

FOREIGN PATENT DOCUMENTS

| JP | 53-095231 A | 4/1988 |
|---|---|---|
| JP | 64-043524 A | 2/1989 |
| JP | 01-263121 A | 10/1989 |
| JP | 01-319530 A | 12/1989 |
| JP | 02-088636 A | 3/1990 |
| JP | 08-318538 A | 12/1996 |
| JP | 10-338745 A | 12/1998 |
| JP | 2012-509375 A | 4/2012 |
| JP | 2013-502476 A | 1/2013 |
| JP | 2016-040344 A | 3/2016 |
| WO | 2015/007774 A1 | 1/2015 |

OTHER PUBLICATIONS

Extended European Search Report dated Aug. 14, 2019 in EP Application No. 17750321.6.
Int'l Search Report dated May 16, 2017 in Int'l Application No. PCT/JP2017/004709.
Office Action dated Dec. 16, 2019 in CN Application No. 201780010262.8.

* cited by examiner

Primary Examiner — Shane Fang
(74) Attorney, Agent, or Firm — Panitch Schwarze Belisario & Nadel LLP

(57) ABSTRACT

An aromatic polysulfone composition is provided which includes an aromatic polysulfone and an organic compound having a boiling point no lower than 100° C. and no higher than 400° C. The organic compound is contained in an amount of at least 0.1 ppm and at most 10 mass % relative to the mass of the aromatic polysulfone. The aromatic polysulfone has repeating units expressed by formula (1):

$$-Ph^1-SO_2-Ph^2-O- \qquad (1)$$

In formula (1), $Ph^1$ and $Ph^2$ represent phenylene groups in which one or more hydrogen atoms that bind to the phenylene groups may, independently of each other, be substituted with an alkyl group having 1 to 10 carbon atoms, an aryl group having 6 to 20 carbon atoms, or a halogen atom.

5 Claims, No Drawings

AROMATIC POLYSULFONE COMPOSITION AND MOLDED ARTICLE

CROSS-REFERENCE TO RELATED APPLICATION

This application is a Section 371 of International Application No. PCT/JP2017/004709, filed Feb. 9, 2017, which was published in the English language on Aug. 17, 2017 under International Publication No. WO 2017/138600 A1, and claims priority under 35 U.S.C. § 119(b) to Japanese Application No. 2016-139738 filed Jul. 14, 2016 and Japanese Application No. 2016-023700, filed Feb. 10, 2016, the disclosures of which are incorporated herein by reference in their entirety.

TECHNICAL FIELD

The present invention relates to an aromatic polysulfone composition and a molded article.

The present application claims priority on Japanese Patent Application No. 2016-23700, filed Feb. 10, 2016, and Japanese Patent Application No. 2016-139738, filed Jul. 14, 2016, the contents of which are incorporated herein by reference.

BACKGROUND ART

Aromatic polysulfones have excellent heat resistance and chemical resistance, and are therefore used in various applications as a material for use in molded bodies. Aromatic polysulfones are normally produced by subjecting aromatic dihalogenosulfone compounds and aromatic dihydroxy compounds to a polycondensation reaction in the co-presence of a base and a reaction solvent (see, e.g., Patent Documents 1 and 2).

The reaction mixture obtained by the above-mentioned polycondensation reaction contains aromatic polysulfones, unreacted bases, byproducts (halogenated alkalis when an alkali metal salt is used as the base), and the reaction solvent. Normally, a method is used to isolate the aromatic polysulfones from this reaction mixture, resulting in a state in which only small amounts of the unreacted bases, byproducts and reaction solvents remain.

Patent Document 3 discloses a method wherein non-solvents such as alcohol and water are used to remove byproducts and solvents from a polymer mixture, and thereafter, the bulk density of aromatic polyether polymers is increased in a mixed solvent containing an aliphatic alcohol and a ketone.

Patent Document 4 discloses a method wherein a polymer mixture is pulverized in a non-solvent, and thereafter heated under reduced pressure at a temperature lower than the glass transition temperature or the melting point of the polymer mixture and equal to or higher than the vapor pressure temperature of the reaction solvent.

Patent Document 5 discloses a method wherein a mixed solvent containing a specific solvent such as 1,3-dimethyl-2-imidazolidinone and a non-solvent of aromatic polyether polymers is added to a crude reaction solution after the removal of byproduct salts, and aromatic polyether polymers are precipitated in the non-solvent, then washed.

RELATED LITERATURE

Patent Literature

[Patent Document 1]
  JP 2012-509375 A
[Patent Document 2]
  JP 2013-502476 A
[Patent Document 3]
  JP S64-043524 A
[Patent Document 4]
  JP H1-263121 A
[Patent Document 5]
  JP S63-095231 A

SUMMARY OF INVENTION

Technical Problem

Conventional aromatic polysulfones such as those described in the above-mentioned Patent Documents 1 to 5 do not necessarily have sufficient heat resistance. Additionally, molded articles formed by molding these aromatic polysulfones do not necessarily have sufficient mechanical strength. Therefore, improvements in the heat resistance of aromatic polysulfones and improvements in the mechanical strength of molded articles formed by molding aromatic polysulfones are desired.

The present invention was made in view of these circumstances, and has, as one purpose, that of providing a molded article having excellent mechanical strength, with high elasticity, stress and the like. Additionally, another purpose is that of providing a novel aromatic polysulfone composition that has excellent heat resistance, capable of resulting in a molded article having excellent mechanical strength, with high elasticity, stress and the like.

Solution to Problem

In order to solve the above-mentioned problem, an embodiment of the present invention provides an aromatic polysulfone composition including an aromatic polysulfone; and an organic compound having a boiling point no lower than 100° C. and no higher than 400° C.; wherein the organic compound is contained in an amount of at least 0.1 ppm and at most 10 mass % relative to the mass of the aromatic polysulfone; and the aromatic polysulfone has repeating units expressed by formula (1):

$$-Ph^1-SO_2-Ph^2-O- \quad (1)$$

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

In one embodiment of the present invention, the organic compound has, as Hansen solubility parameters, a dispersion parameter $\delta D$ (units: $MPa^{0.5}$) of at least 16.0 and at most 22.0, a polarity parameter $\delta P$ (units: $MPa^{0.5}$) of at least 12.0 and at most 16.4, and a hydrogen bonding parameter $\delta H$ (units: $MPa^{0.5}$) of at least 3.0 and at most 12.0.

In one embodiment of the present invention, the organic compound is an aprotic polar solvent.

In one embodiment of the present invention, the organic compound is N-methyl-2-pyrrolidone.

One embodiment of the present invention is a molded article comprising an aromatic polysulfone; and an organic compound having a boiling point no lower than 100° C. and no higher than 400° C.; wherein the organic compound is contained in an amount of at least 0.1 ppm and at most 3 mass % relative to the mass of the aromatic polysulfone; and the aromatic polysulfone has repeating units expressed by formula (1):

$-Ph^1-SO_2-Ph^2-O-$      (1)

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

In other words, the present invention has the following embodiments.

<1> An aromatic polysulfone composition including:
an aromatic polysulfone; and
an organic compound having a boiling point no lower than 100° C. and no higher than 400° C.; wherein
the organic compound is contained in an amount of at least 0.1 ppm and at most 10 mass % relative to the mass of the aromatic polysulfone; and
the aromatic polysulfone has repeating units expressed by formula (1):

$-Ph^1-SO_2-Ph^1-O-$      (1)

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

<2> The aromatic polysulfone composition according to <1>, wherein the organic compound has, as Hansen solubility parameters, a dispersion parameter $\delta D$ (units: $MPa^{0.5}$) of at least 16.0 and at most 22.0, a polarity parameter SP (units: $MPa^{0.5}$) of at least 12.0 and at most 16.4, and a hydrogen bonding parameter $\delta H$ (units: $MPa^{0.5}$) of at least 3.0 and at most 12.0.

<3> The aromatic polysulfone composition according to <1> or <2>, wherein the organic compound is an aprotic polar solvent.

<4> The aromatic polysulfone composition according to any one of <1> to <3>, wherein the organic compound is N-methyl-2-pyrrolidone.

<5> A molded article including:
an aromatic polysulfone; and
an organic compound having a boiling point no lower than 100° C. and no higher than 400° C.; wherein
the organic compound is contained in an amount of at least 0.1 ppm and at most 3 mass % relative to the mass of the aromatic polysulfone; and
the aromatic polysulfone has repeating units expressed by formula (1):

$-Ph^1-SO_2-Ph^2-O-$      (1)

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

Advantageous Effects of Invention

According to one embodiment of the present invention, a molded article having excellent mechanical strength, with high elasticity, stress and the like, is provided. Additionally, a novel aromatic polysulfone composition that has excellent heat resistance, capable of resulting in a molded article having excellent mechanical strength, with high elasticity, stress and the like, is provided.

DESCRIPTION OF EMBODIMENTS

<Aromatic Polysulfone Composition>

The aromatic polysulfone composition according to the present embodiment includes an aromatic polysulfone; and an organic compound (hereinafter sometimes referred to as "Compound A") having a boiling point no lower than 100° C. and no higher than 400° C.; wherein the organic compound is contained in an amount of at least 0.1 ppm and at most 10 mass % relative to the mass of the aromatic polysulfone.

[Aromatic Polysulfone]

In the present embodiment, the aromatic polysulfone has the repeating units expressed by formula (1) (hereinafter sometimes referred to as "repeating unit (1)"), in view of the heat resistance and the chemical resistance. Additionally, aromatic polysulfones having the repeating units (1) are sometimes referred to as aromatic polyethersulfones. The aromatic polysulfones may further have one or more other repeating units such as the repeating units expressed by formula (2) (hereinafter sometimes referred to as "repeating unit (2)"), the repeating units expressed by formula (3) (hereinafter sometimes referred to as "repeating unit (3)") or the like.

$-Ph^1-SO_2-Ph^2-O-$      (1)

In formula (1), $Ph^1$ and $Ph^2$ represent phenylene groups, in which one or more hydrogen atoms in the phenylene groups may, independently of each other, be substituted with an alkyl group having 1 to 10 carbon atoms, an aryl group having 6 to 20 carbon atoms, or a halogen atom.

$-Ph^1-R-Ph^4-O-$      (2)

In formula (2), $Ph^3$ and $Ph^4$ represent phenylene groups, in which one or more hydrogen atoms in the phenylene groups may, independently of each other, be substituted with an alkyl group having 1 to 10 carbon atoms, an aryl group having 6 to 20 carbon atoms, or a halogen atom. R represents an alkylidene group having 1 to 5 carbon atoms, an oxygen atom or a sulfur atom.

$-(Ph^5)_n-O-$      (3)

In formula (3), $Ph^5$ represents a phenylene group, in which one or more hydrogen atoms in the phenylene groups may, independently of each other, be substituted with an alkyl group having 1 to 10 carbon atoms, an aryl group having 6 to 20 carbon atoms, or a halogen atom. n represents an integer from 1 to 3, and when n is 2 or more, the multiple units $Ph^5$ may be identical to or different from each other.

The phenylene groups represented by one of $Ph^1$ to $Ph^5$ are, independently of each other, p-phenylene groups, m-phenylene groups or o-phenylene groups, among which p-phenylene groups are preferred.

Examples of alkyl groups having 1 to 10 carbon atoms that may substitute hydrogen atoms in the phenylene groups include methyl groups, ethyl groups, n-propyl groups, isopropyl groups, n-butyl groups, isobutyl groups, sec-butyl groups, tert-butyl groups, n-pentyl groups, n-hexyl groups, n-heptyl groups, 2-ethylhexyl groups, n-octyl groups and n-decyl groups.

Examples of aryl groups having 6 to 20 carbon atoms that may substitute hydrogen atoms in the phenylene groups include phenyl groups, o-tolyl groups, m-tolyl groups, p-tolyl groups, 1-napththyl groups and 2-napththyl groups.

Examples of halogen atoms that may substitute hydrogen atoms in the phenylene groups include fluorine atoms, chlorine atoms, bromine atoms and iodine atoms.

When the hydrogen atoms in the phenylene groups are substituted by these groups, the number thereof is preferably two or less, more preferably one, in each of the phenylene groups, independently of each other.

Examples of the alkylidene group having 1 to 5 carbon atoms represented by R include methylene groups, ethylidene groups, isopropylidene groups and 1-butylidene groups.

The aromatic polysulfone preferably contains the repeating units (1) in an amount of at least 50 mol %, more preferably at least 80 mol %, with respect to the total number of moles of all repeating units constituting the aromatic polysulfone, and it is more preferable for the repeating units to substantially include only the repeating units (1). In other words, the aromatic polysulfone preferably contains the repeating units (1) in an amount of 50 to 100 mol %, more preferably 80 to 100 mol %, with respect to the total number of moles of all repeating units constituting the aromatic polysulfone, and it is more preferable for the repeating units to substantially include only the repeating units (1). The aromatic polysulfone may contain two or more types of the repeating units (1) to (3), independently of each other.

The reduced viscosity (units: dL/g) of the aromatic polysulfone of the present embodiment is preferably at least 0.18, more preferably at least 0.22 and at most 0.80. In other words, the reduced viscosity (units: dL/g) of the aromatic polysulfone is preferably at least 0.18 and at most 0.80, more preferably at least 0.22 and at most 0.80. In the present specification, the reduced viscosity can be measured by means of the method described in the examples below. For the aromatic polysulfone, the heat resistance and the strength/rigidity when a molded article is formed tend to improve as the reduced viscosity becomes higher. However, if the reduced viscosity is too high, the melting temperature and melt viscosity tend to become higher, and the fluidity tends to become lower.

[Compound A]

The boiling point of compound A according to the present embodiment is no lower than 100° C. and no higher than 400° C., preferably no lower than 100° C. and no higher than 350° C. The boiling point of compound A is more preferably no lower than 100° C. and no higher than 250° C. because less energy then becomes necessary when reducing the amount of compound A contained in the aromatic polysulfone composition. It is even more preferable for the boiling point of compound A to be no lower than 200° C. and no higher than 225° C.

In the present specification, the boiling point can be measured by applying a known method. Alternatively, in the case of a single compound, it is possible to refer to the values described in a document such as a chemical handbook. The boiling points used in the present specification are the values as measured at 1 atmosphere.

Of the Hansen solubility parameters of compound A, the dispersion parameter $\delta D$ (units: $MPa^{0.5}$) is preferably at least 16.0 and at most 22.0, more preferably at least 16.0 and at most 20.0, and even more preferably at least 16.0 and at most 19.0.

Of the Hansen solubility parameters of compound A, the polarity parameter $\delta P$ (units: $MPa^{0.5}$) is at least 12.0 and at most 16.4, more preferably at least 12.0 and at most 15.0, and even more preferably at least 12.0 and at most 14.5.

Of the Hansen solubility parameters of compound A, the hydrogen bonding parameter $\delta H$ (units: $MPa^{0.5}$) is at least 3.0 and at most 12.0, more preferably at least 3.0 and at most 8.0, and even more preferably at least 7.0 and at most 8.0.

As the Hansen solubility parameters, it is preferable for the dispersion parameter $\delta D$ (units: $MPa^{0.5}$) to be at least 16.0 and at most 22.0, the polarity parameter $\delta P$ (units: $MPa^{0.5}$) to be at least 12.0 and at most 16.4, and the hydrogen bonding parameter $\delta H$ (units: $MPa^{0.5}$) to be at least 3.0 and at most 12.0. As the Hansen solubility parameters, it is more preferable for the dispersion parameter $\delta D$ (units: $MPa^{0.5}$) to be at least 16.0 and at most 19.0, the polarity parameter $\delta P$ (units: $MPa^{0.5}$) to be at least 12.0 and at most 16.4, and the hydrogen bonding parameter $\delta H$ (units: $MPa^{0.5}$) to be at least 7.0 and at most 12.0.

The Hansen solubility parameters are useful for predicting the ability of a solvent material to dissolve a specific solute. The dispersion parameter $\delta D$ represents the energy due to the dispersive force between the molecules, the polarity parameter $\delta P$ represents the energy due to the polar force between the molecules, and the hydrogen bonding parameter $\delta H$ represents the energy due to the hydrogen bonding force.

The Hansen solubility parameters can be calculated from chemical formulas, for example, by using the computer software, "Hansen Solubility Parameters in Practice" (HSPiP). Additionally, for example, it is possible to use the Hansen Solubility parameters described in *Hansen Solubility Parameters: A User's Handbook, Second Edition* (by Charles M. Hansen, published by CRC Press, 2007). In the present invention, it is possible to use the values in *Hansen Solubility Parameters: A User's Handbook, Second Edition* for the compounds described therein, and values obtained by calculation using HSPiP ver. 5.0.03 for compounds that are not described.

Compound A is preferably an aprotic polar solvent. Examples thereof include sulfoxides such as dimethyl sulfoxide; amides such as dimethyl formamide, N-methyl-2-pyrrolidone and N-ethyl-2-pyrrolidone; sulfones such as dimethyl sulfone, diethyl sulfone, diisopropyl sulfone and diphenyl sulfone; and compounds having a urea backbone in which a hydrogen atom bonded to a nitrogen atom may be substituted, such as 1,3-diethyl-2-imidazolidinone.

Compound A is more preferably an aprotic polar solvent for which the Hansen solubility parameters satisfy the above-mentioned conditions, and examples thereof include dimethyl sulfoxide, N-methyl-2-pyrrolidone, N-ethyl-2-pyrrolidone and diphenyl sulfone. More preferable examples include N-methyl-2-pyrrolidone, N-ethyl-2-pyrrolidone and diphenyl sulfone. Even more preferable examples include N-methyl-2-pyrrolidone and N-ethyl-2-pyrrolidone. Table 1 shows the values of the Hansen solubility parameters (dispersion parameter $\delta D$, polarity parameter $\delta P$ and hydrogen bonding parameter $\delta H$) for typical aprotic polar solvents that are used as compound A.

TABLE 1

| | Hansen Solubility Parameters | | |
|---|---|---|---|
| | $\delta D$ ($MPa^{0.5}$) | $\delta P$ ($MPa^{0.5}$) | $\delta H$ ($MPa^{0.5}$) |
| N-methyl-2-pyrrolidone | 18.0 | 12.3 | 7.2 |
| N-ethyl-2-pyrrolidone | 18.0 | 12.0 | 7.0 |
| Diphenyl sulfone | 21.1 | 14.4 | 3.4 |
| Dimethyl sulfoxide | 18.4 | 16.4 | 10.2 |

Additionally, the boiling points of N-methyl-2-pyrrolidone, N-ethyl-2-pyrrolidone, diphenyl sulfone and dimethyl sulfoxide are respectively 202° C., 218° C., 379° C. and 189° C.

In the present embodiment, compound A may be a single type used alone, or may be a combination of two or more types.

By containing at least 0.1 ppm of compound A relative to the mass of the aromatic polysulfone, the mechanical strength of molded articles obtained by molding the aromatic polysulfone composition is improved. When the amount of compound A that is contained relative to the mass of the aromatic polysulfone is greater than 10 mass %, the heat resistance decreases so that the aromatic polysulfone composition melts at a temperature lower than the glass transition temperature (Tg) of the aromatic polysulfone (e.g., a temperature below (Tg—50) ° C.). In other words, the amount of compound A that is contained relative to the mass of the aromatic polysulfone is preferably at most 10 mass % because the heat resistance rises and the aromatic polysulfone composition can be kept from melting at a temperature lower than the glass transition temperature (Tg) of the aromatic polysulfone (e.g., a temperature below (Tg—50) ° C.). Therefore, the amount of compound A that is contained relative to the mass of the aromatic polysulfone is at least 0.1 ppm and at most 10 mass %. Additionally, in order to suppress coloration of the aromatic polysulfone composition, the amount of compound A that is contained relative to the mass of the aromatic polysulfone is preferably at least 0.1 ppm and at most 4 mass %, more preferably at least 0.1 ppm and at most 2 mass %, even more preferably at least 1 ppm and at most 2 mass %, and most preferably at least 5 ppm and at most 2 mass %. In order to reduce the amount of compound A that is volatilized during processing, the amount of compound A that is contained relative to the mass of the aromatic polysulfone is preferably at least 5 ppm and at most 2000 ppm, more preferably at least 5 ppm and at most 200 ppm %, and even more preferably at least 5 ppm and at most 50 ppm %.

Due to the amount of compound A that is contained relative to the mass of the aromatic polysulfone satisfying the above-mentioned conditions, the aromatic polysulfone composition of the present embodiment exhibits excellent heat resistance.

For example, when the aromatic polysulfone composition is dried at a temperature lower than the Tg of the aromatic polysulfone, the aromatic polysulfone composition will partially or completely melt and fuse to the surrounding aromatic polysulfone composition if the amount of compound A relative to the mass of the aromatic polysulfone is greater than 10 mass %. On the other hand, the melting of the aromatic polysulfone composition will be suppressed if the amount of compound A that is contained relative to the mass of the aromatic polysulfone is at most 10 wt %, and this is therefore preferred. Additionally, the aromatic polysulfone composition will be partially or completely colored if the amount of compound A that is contained relative to the mass of the aromatic polysulfone is greater than 4 mass %. On the other hand, the coloration of the aromatic polysulfone composition will be suppressed if the amount of compound A that is contained relative to the mass of the aromatic polysulfone is at most 4 mass %, and this is therefore preferred. The aromatic polysulfone composition preferably does not melt at a temperature lower than the Tg of the aromatic polysulfone. More preferably, both melting and coloration are suppressed.

Normally, the less an aromatic polysulfone composition melts and becomes colored, the better the heat resistance can be considered to be.

<Aromatic Polysulfone Composition Production Method>

The method for producing the aromatic polysulfone composition according to the present embodiment is a method wherein the aromatic polysulfone composition is produced by mixing an aromatic dihalogenosulfone compound, an aromatic dihydroxy compound, a base and a solvent, and inducing a polycondensation reaction between the aromatic dihalogenosulfone compound and the aromatic dihydroxy compound.

[Monomer Species]

The aromatic dihalogenosulfone compound and the aromatic dihydroxy compound correspond to the repeating units forming the aromatic polysulfone. The aromatic dihalogenosulfone compound may only be a compound having, in one molecule, an aromatic ring, a sulfonyl group ($-SO_2-$), and two halogeno groups. The aromatic dihydroxy compound may only be a compound having, in one molecule, an aromatic ring and two hydroxy groups.

For example, an aromatic polysulfone having the repeating units (1) can be produced by inducing a polycondensation reaction between a compound expressed by formula (4) (hereinafter sometimes referred to as "compound (4)") and a compound expressed by formula (5) (hereinafter sometimes referred to as "compound (5)").

An aromatic polysulfone having the repeating units (1) and the repeating units (2) can be produced by inducing a polycondensation reaction between compound (4) and a compound expressed by formula (6) (hereinafter sometimes referred to as "compound (6)").

An aromatic polysulfone having the repeating units (1) and the repeating units (3) can be produced by inducing a polycondensation reaction between compound (4) and a compound expressed by formula (7) (hereinafter sometimes referred to as "compound (7)").

$$X^1-Ph^1-SO_2-Ph^2-X^2 \quad (4)$$

In formula (4), $X^1$ and $X^2$, independently of each other, represent halogen atoms. $Ph^1$ and $Ph^2$ are as defined above.

$$HO-Ph^1-SO_2-Ph^2-OH \quad (5)$$

In formula (5), $Ph^1$ and $Ph^2$ are as defined above.

$$HO-Ph^3-R-Ph^4-OH \quad (6)$$

In formula (6), $Ph^3$, $Ph^4$ and R are as defined above.

$$HO-(Ph^5)-OH \quad (7)$$

In formula (7), $Ph^5$ and n are as defined above.

In formula (4), $X^1$ and $X^2$, independently of each other, represent halogen atoms, examples of which are the same as the aforementioned halogen atoms that may substitute hydrogen atoms in phenylene groups.

Examples of compound (4) include bis(4-chlorophenyl) sulfone and 4-chlorophenyl-3',4'-dichlorophenyl sulfone.

Examples of compound (5) include bis(4-hydroxyphenyl) sulfone, bis(4-hydroxy-3,5-dimethylphenyl) sulfone and bis(4-hydroxy-3-phenylphenyl) sulfone.

Examples of compound (6) include 2,2-bis(4-hydroxyphenyl) propane, 2,2-bis(4-hydroxyphenyl) hexafluoropropane, bis(4-hydroxyphenyl) sulfide, bis(4-hydroxy-3-methylphenyl) sulfide and bis(4-hydroxyphenyl) ether.

Examples of compound (7) include hydroquinone, resorcinol, catechol, phenyl hydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl. Among these, hydroquinone, resorcinol, catechol, phenyl hydroquinone, 2,2'-dihydroxybiphenyl, 3,5,3',5'-tetramethyl-4,4'-dihydroxybiphenyl, 2,2'-diphenyl-4,4'-dihydroxybiphenyl and 4,4'-dihydroxy-p-quaterphenyl are preferred.

An example of an aromatic dihalogenosulfone compound other than compound (4) is 4,4'-bis(4-chlorophenylsulfonyl)biphenyl.

In the present invention, some or all of the aromatic dihalogenosulfone compound and the aromatic dihydroxy compound may be replaced with a compound having a halogeno group and a hydroxy group in the molecule, such as 4-hydroxy-4'-(4-chlorophenylsulfonyl)biphenyl.

In the present invention, the aromatic dihalogenosulfone compound and the aromatic dihydroxy compound may each be a single type used alone or may be a combination of two or more types, in accordance with the type of aromatic polysulfone that is sought.

[Base]

The polycondensation of the aromatic dihalogenosulfone compound and the aromatic dihydroxy compound is preferably performed by using an alkali metal salt of carbonic acid as the base. The reaction is preferably carried out in an organic solvent as the polycondensation solvent, and it is more preferably carried out in an organic solvent, using an alkali metal salt of carbonic acid as the base.

The alkali metal salt of carbonic acid may be an alkali carbonate (carbonic acid salt of an alkali metal), which is a normal salt, an alkali bicarbonate (alkali hydrogencarbonate, hydrogencarbonate of an alkali metal), which is an acidic salt, or a mixture thereof (alkali carbonate and alkali bicarbonate). Examples of preferred alkali carbonates include sodium carbonate and potassium carbonate and the like. Examples of preferred alkali bicarbonates include sodium bicarbonate (sodium hydrogencarbonate) and potassium bicarbonate (sodium hydrogencarbonate) and the like. In the present invention, the base may be a single type used alone or may be a combination of two or more types.

[Organic Solvent]

The polycondensation of the aromatic dihalogenosulfone compound and the aromatic dihydroxy compound is preferably performed using compound A as the organic solvent.

[Polycondensation]

In the method for producing the aromatic polysulfone composition according to the present embodiment, as a first step, the aromatic dihalogenosulfone compound and the aromatic dihydroxy compound are dissolved in compound A. As a second step, an alkali metal salt of carbonic acid is added to the solution obtained in the first step, thereby inducing a polycondensation reaction between the aromatic dihalogenosulfone compound and the aromatic dihydroxy compound. As a third step, unreacted bases, byproducts (halogenated alkalis when an alkali metal salt is used as the base), and excess compound A are removed from the reaction mixture obtained in the second step, thereby yielding the aromatic polysulfone composition.

The dissolution temperature during the first step should preferably be no lower than 40° C. and no higher than 180° C. The polycondensation reaction temperature during the second step should preferably be no lower than 180° C. and no higher than 400° C. Assuming that no side reactions occur, the higher the polycondensation temperature is, the faster the desired polycondensation progresses, thus making the degree of polymerization of the resulting aromatic polysulfone higher, as a result of which the reduced viscosity of the aromatic polysulfone tends to be higher. However, in actuality, side reactions similar to the above tend to occur as the polycondensation temperature becomes higher, and these side reactions cause the degree of polymerization of the resulting aromatic polysulfone to decrease. Thus, the polycondensation temperature must be adjusted so that an aromatic polysulfone having a predetermined reduced viscosity can be obtained, taking the degree of these side reactions into consideration. The predetermined reduced viscosity may be a reduced viscosity within the range from at least 0.18 to at most 0.80, which is a preferred range, or within the range from at least 0.22 to at most 0.80, which is a more preferred range.

The blending ratio of the aromatic dihydrogenosulfone compound with respect to the aromatic dihydroxy compound is preferably at least 80 mol % and at most 120 mol %, and more preferably at least 90 mol % and at most 110 mol %.

The ratio of the alkali metal salt of carbonic acid used with respect to the aromatic dihydroxy compound is preferably at least 90 mol % and at most 130 mol %, more preferably at least 95 mol % and at most 120 mol % in terms of the alkali metal.

Assuming that no side reactions occur, the higher the ratio of the alkali metal salt of the carbonic acid that is used, the faster the desired polycondensation progresses, thus making the degree of polymerization of the resulting aromatic polysulfone higher, as a result of which the reduced viscosity of the aromatic polysulfone tends to be higher.

However, in actuality, side reactions similar to the above tend to occur as the ratio of the alkali metal salt of the carbonic acid that is used becomes higher, and these side reactions cause the degree of polymerization of the resulting aromatic polysulfone to decrease. Thus, the ratio of the alkali metal salt of the carbonic acid that is used must be adjusted so that an aromatic polysulfone having a predetermined reduced viscosity can be obtained, taking the degree of these side reactions into consideration.

The polycondensation in the second step may normally be performed by gradually raising the temperature while removing water that is generated as a byproduct, and after the reflux temperature of compound A has been reached, further maintaining the temperature, preferably for at least 1 hour and at most 50 hours, and more preferably at least 2 hours and at most 30 hours. Assuming that no side reactions occur, as the polycondensation time becomes longer, the desired polycondensation progresses further, so the degree of polymerization of the resulting aromatic polysulfone becomes higher, as a result of which the reduced viscosity of the aromatic polysulfone tends to be higher. However, in actuality, side reactions similar to the above tend to progress as the polycondensation time becomes longer, and these side reactions cause the degree of polymerization of the resulting aromatic polysulfone to decrease. Thus, the polycondensation time must be adjusted so that an aromatic polysulfone having a predetermined reduced viscosity can be obtained, taking the degree of these side reactions into consideration.

In the third step, the unreacted alkali metal salts of the carbonic acid and halogenated alkalis generated as byproducts are removed, by filtration, extraction, centrifugation or the like, from the reaction mixture obtained in the second step, thereby resulting in a solution obtained by dissolving the aromatic polysulfone in compound A. Next, the excess is removed from this solution while leaving a predetermined amount of compound A, thereby resulting in the aromatic polysulfone composition.

In the present production method, compound A may, for example, be directly reduced in the aromatic polysulfone solution under reduced pressure or under compression. Preferably, the above-mentioned solution is mixed with a poor solvent of the aromatic polysulfone so as to induce the precipitation of the aromatic polysulfone, and compound A is removed by filtration, centrifugation or the like. By further repeatedly washing the above-mentioned precipitate with the poor solvent, the aromatic polysulfone composition may be obtained.

Herebelow, an example of a method for adjusting the amount of compound A contained in the composition will be explained in detail.

The aromatic polysulfone that has precipitated in the poor solvent is present, in the poor solvent, as a mixed precipitate including the aromatic polysulfone and compound A. For this reason, when the solution (aromatic polysulfone solution and poor solvent) in which the aromatic polysulfone has precipitated is filtered or centrifuged, the mixed precipitate and the solvent (compound A and poor solvent) are separated, and a mixed precipitate is obtained.

When the resulting mixed precipitate is dispersed in the poor solvent, compound A is eluted from the mixed precipitate into the poor solvent surrounding the mixed precipitate. At the same time, the poor solvent surrounding the mixed precipitate penetrates into the mixed precipitate. This transfer of the poor solvent and compound A continues, in the dispersion system wherein the mixed precipitate has been dispersed in the poor solvent, until the concentration of compound A becomes the same both in the mixed precipitate and in the dispersion medium surrounding the mixed precipitate, in other words, until the mixed precipitate and the dispersion medium surrounding the mixed precipitate reach equilibrium.

At this time, if the amount of compound A contained in the mixed precipitate and the amount of the poor solvent used for washing are known, then the amount of compound A remaining in the mixed precipitate when the transfer of the solvent (compound A and poor solvent) in the dispersion system reaches equilibrium can be estimated on the basis of these amounts.

For this reason, the amount of compound A remaining in the mixed precipitate can be controlled by controlling the amount of the poor solvent used for washing. By pre-dissolving compound A in the poor solvent used for washing, it is possible to suppress the amount of compound A eluted from the mixed precipitate into the surrounding poor solvent when the transfer of the solvent in the dispersion system reaches equilibrium, compared to the case in which washing is performed using only the poor solvent, thereby allowing a large amount of compound A to remain in the mixed precipitate.

In the present production method, the amount of the poor solvent used, the washing time, the washing temperature, the number of washes and the stirring speed can be adjusted so as to obtain an aromatic polysulfone composition containing a predetermined amount of compound A. For example, the amount of compound A that is contained can be decreased by increasing the amount of the poor solvent used, prolonging the washing time until equilibrium is reached, raising the washing temperature, increasing the number of washes or raising the stirring speed. It is possible to combine two or more of the above operations.

Examples of poor solvents of the aromatic polysulfone include methanol, ethanol, isopropyl alcohol, acetone, hexane, heptane and water, among which water and methanol are preferred for being available at a low cost.

In the present embodiment, the poor solvent of the aromatic polysulfone may be a single type used alone or a combination of two or more types.

<Molded Article>

The molded article according to the present embodiment includes an aromatic polysulfone and an organic compound (hereinafter sometimes referred to as "compound A") having a boiling point no lower than 100° C. and no higher than 400° C., wherein compound A is contained in the amount of at least 0.1 ppm and at most 3 mass % relative to the mass of the aromatic polysulfone. The amount of compound A contained in the molded article, relative to the mass of the aromatic polysulfone, is preferably at least 0.1 ppm and at most 2 mass %, more preferably at least 1 ppm and at most 1000 ppm %, even more preferably at least 1 ppm and at most 150 ppm %, particularly preferably at least 1 ppm and at most 100 ppm %, and most preferably at least 1 ppm and at most 30 ppm %.

One aspect of the present invention is a molded article obtained by molding the aromatic polysulfone composition under the molding conditions described below.

Another aspect of the present invention is a molded article wherein, when a dumbbell-shaped type 3 testing piece is prepared from the molded article of the present invention in accordance with JIS K6251, and the testing piece is measured in an autograph with a grip spacing of 50 mm and a pulling speed of 5 nm/minute, the elasticity (units: GPa) at 23° C. and 50% humidity is at least 3.3 and at most 4.0.

Yet another aspect of the present invention is a molded article wherein, when a dumbbell-shaped type 3 testing piece is prepared from the molded article of the present invention in accordance with JIS K6251, and the testing piece is measured in an autograph with a grip spacing of 50 mm and a pulling speed of 5 nm/minute, the elasticity (units: GPa) at 23° C. and 50% humidity is at least 3.3 and at most 4.0, and the stress (units: MPa) is at least 73 and at most 85.

Specific examples of molded articles include bobbins such as optical pickup bobbins and transformer bobbins; relay components such as relay cases, relay bases, relay sprues and relay armatures; connectors such as RIMMs, DDRs. CPU sockets, S/Os, DIMMs, board-to-board connectors, FPC connectors and card connectors; reflectors such a lamp reflectors and LED reflectors; holders such as lamp holders and heater holders; vibration plates such as speaker vibration plates; separation claws such as copier separation claws and printer separation claws; camera module components; switch components; motor components; sensor components; hard disk drive components; kitchenware such as ovenware; automobile components; aircraft components; and sealing members such as semiconductor sealing members and coil sealing members.

The aromatic polysulfone according to the present embodiment has the repeating units expressed by formula 1 (hereinafter sometimes referred to as "repeating unit (1)").

$$-Ph^1-SO_2-Ph^2-O- \qquad (1)$$

where, in formula (1), $Ph^1$ and $Ph^2$ represent phenylene groups, in which one or more hydrogen atoms in the phenylene groups may, independently of each other, be substituted with an alkyl group having 1 to 10 carbon atoms, an aryl group having 6 to 20 carbon atoms, or a halogen atom.

[Aromatic Polysulfone]

In the present embodiment, the aromatic polysulfone including the repeating units (1) may be the same as that used in the above-mentioned aromatic polysulfone composition.

[Compound A]

The compound A contained in the molded article according to the present embodiment may be the same as that used in the above-mentioned aromatic polysulfone composition. In other words, compound A in the present embodiment has a boiling point no lower than 100° C. and no higher than 400° C., preferably a boiling point no lower than 100° C. and no higher than 350° C. The boiling point of compound A is more preferably no lower than 100° C. and no higher than 250° C. because less energy then becomes necessary when reducing the amount of compound A contained in the molded article. The boiling point of compound A is even more preferably no lower than 200° C. and no higher than 225° C.

Of the Hansen solubility parameters of compound A, the dispersion parameter δD (units: MPa$^{0.5}$) is preferably at least 16.0 and at most 22.0, more preferably at least 16.0 and at most 20.0, and even more preferably at least 16.0 and at most 19.0.

Of the Hansen solubility parameters of compound A, the polarity parameter δP (units: MPa$^{0.5}$) is preferably at least 12.0 and at most 16.4, more preferably at least 12.0 and at most 15.0, and even more preferably at least 12.0 and at most 14.5.

Of the Hansen solubility parameters of compound A, the hydrogen bonding parameter δH (units: MPa$^{0.5}$) is preferably at least 3.0 and at most 12.0, more preferably at least 3.0 and at most 8.0, and even more preferably at least 7.0 and at most 8.0.

As the Hansen solubility parameters, it is preferable for the dispersion parameter δD (units: MPa$^{0.5}$) to be at least 16.0 and at most 22.0, the polarity parameter δP (units: MPa$^{0.5}$) to be at least 12.0 and at most 16.4, and the hydrogen bonding parameter δH (units: MPa$^{0.5}$) to be at least 3.0 and at most 12.0.

As the Hansen solubility parameters, it is more preferable for the dispersion parameter δD (units: MPa$^{0.5}$) to be at least 16.0 and at most 19.0, the polarity parameter δP (units: MPa$^{0.5}$) to be at least 12.0 and at most 16.4, and the hydrogen bonding parameter δH (units: MPa$^{0.5}$) to be at least 7.0 and at most 12.0.

<Molded Article Production Method>

A molded article can be formed by using the aromatic polysulfone composition according to the present embodiment as the raw material for molding so that the amount of compound A relative to the mass of the aromatic polysulfone is within the above-mentioned range.

An example of a molded article production method is compression molding wherein an aromatic polysulfone composition is made to flow into a mold, then heated, compressed and hardened. While there is no limitation on the heating temperature, it should preferably be performed at a temperature of 200 to 400° C., more preferably 250 to 350° C. While there is no limitation on the pressure during compression, the pressure should be sufficient for grains of the aromatic polysulfone composition to fuse, preferably 1 to 60 MPa, more preferably 3 to 50 MPa.

Other examples of the molded article production method include calender molding wherein the aromatic polysulfone composition is melted while being kneaded between heated rollers, then stretched to a predetermined thickness by being passed between multiple rollers; injection molding wherein the aromatic polysulfone composition is loaded in the tip of a cylinder, and this aromatic polysulfone composition is molded by being injected, at once, into a mold attached to the end of the cylinder; and extrusion molding wherein the aromatic polysulfone composition is placed in a heated cylinder and a screw installed inside the cylinder is rotated so as to melt the aromatic sulfone composition while feeding it forward, and pushing it out through a mouthpiece.

According to the present invention, a molded article having excellent mechanical strength, with high elasticity, stress and the like, is provided. A novel aromatic polysulfone composition that has excellent heat resistance, capable of resulting in a molded article having excellent mechanical strength, with high elasticity, stress and the like, is provided.

EXAMPLES

Herebelow, the present invention will be explained in detail by referring to examples and comparative examples, but the present invention is not to be construed as being limited thereto.

Measurements of the reduced viscosity of the aromatic polysulfones, quantitative analyses of compound A contained in the aromatic polysulfone compositions, evaluations of the heat resistance of the aromatic polysulfone compositions, preparation of molded articles, quantitative analyses of compound A contained in the molded articles, and mechanical properties evaluation were performed, respectively, by the following methods.

[Measurement of Reduced Viscosity of Aromatic Polysulfones]

Approximately 1 g of an aromatic polysulfone was dissolved in N,N-dimethyl formamide (special-grade reagent), the volume thereof was set to 1 dL, and the outflow time (seconds) of this solution was measured at 25° C. using an Ostwald viscometer. Additionally, the outflow time (seconds) of the solvent, N,N-dimethyl formamide, was measured at 25° C. using the Ostwald viscometer. The outflow time (t) of the aromatic polysulfone solution and the outflow time ($t_0$) of N,N-dimethyl formamide were used to determine $((t-t_0)/t_0)$, and this value was divided by the concentration (approximately 1 g/dL) of the aromatic polysulfone solution to thereby determine the reduced viscosity (dL/g) of the aromatic polysulfone.

Normally, a higher reduced viscosity value can be considered to correspond to a higher molecular weight.

[Quantitative Analysis of Compound A Contained in Aromatic Polysulfone Composition]

A known amount of the aromatic polysulfone composition and a known amount of methanol were mixed for two or more hours at room temperature. The concentration of compound A in methanol was calculated from the gas chromatography area ratio. Next, the amount of compound A contained in the aromatic polysulfone composition was calculated from the amounts of the aromatic polysulfone composition and the methanol.

[Preparation of Molded Article]

An aromatic polysulfone composition was sandwiched between a pair of aluminum sheets. The entire assembly was further sandwiched between a pair of steel sheets, and in a hot press, preheated for 5 minutes at 300° C., then heated and compressed for 2 minutes at a sufficient pressure to fuse the grains of the aromatic polysulfone composition. Next, aluminum spacers were used when cooling the assembly in a cold press set to 25° C., thereby preparing a molded article in the form of a pressed sheet having a thickness of approximately 0.1 mm.

[Quantitative Analysis of Compound A in Molded Article]

The molded article was pulverized so that the short sides thereof were at most 0.5 mm, and a known amount of the pulverized molded article was mixed, for at least 4 hours at room temperature, with a known amount of a mixed solution obtained by mixing acetone and methanol at a volume ratio of 1:1. The concentration of compound A in the mixed solution was calculated from the gas chromatography area ratio. Next, the amount of compound A contained in the molded article was calculated from the amounts of the molded article and the mixed solution.

[Evaluation of Heat Resistance]

When an aromatic polysulfone composition was dried at 150° C., if the aromatic polysulfone composition partially or completely melted and fused to the surrounding aromatic polysulfone composition, the grade "c" was recorded. If the aromatic polysulfone composition became partially or completely colored but did not melt, the grade "b" was recorded. If the aromatic polysulfone composition was not melted or colored, the grade "a" was recorded.

[Evaluation of Mechanical Properties]

A JIS K6251 dumbbell-shaped type 3 testing piece was prepared from the above-mentioned molded article. In an autograph, the elasticity (units: GPa) and stress (MPa) in a 23° C. and 50% humidity atmosphere were measured with a grip spacing of 50 mm and a pulling speed of 5 mm/minute.

Production of Aromatic Polysulfone Composition

Production Example 11

87.44 g (0.3045 mol) of bis(4-chlorophenyl) sulfone, 75.08 g (0.3000 mol) of bis(4-hydroxyphenyl) sulfone, 43.54 g (0.3150 mol) of potassium carbonate and 160 mL of N-methyl-2-pyrrolidone (hereinafter sometimes referred to as "NMP"), as compound A, were mixed in a polymerization tank including a stirrer, a nitrogen feeding pipe, a thermometer and a condenser having a receiver appended to the tip thereof, and allowed to react for 6 hours at 190° C. Next, the resulting mixed reaction solution was diluted with NMP and cooled to room temperature, causing the unreacted potassium carbonate and potassium chloride generated as a byproduct, to precipitate. By removing the above-mentioned inorganic salts by filtration, an aromatic polysulfone solution was obtained. The above-mentioned solution was dripped into water, causing the aromatic polysulfone to precipitate, and unwanted NMP was removed by filtration to obtain a mixed precipitate (aromatic polysulfone and NMP). The reduced viscosity of the resulting aromatic polysulfone was 0.511 dL/g.

Examples 1 to 5

The mixed precipitate obtained in Production Example 1 was repeatedly washed with water, then heated and dried at 150° C., thereby resulting in an aromatic polysulfone composition. The amounts of NMP contained in the aromatic polysulfone composition obtained by changing the number of washes were respectively 9.1 mass % (Example 1), 3.5 mass % (Example 2), 1.8 mass % (Example 3), 1200 ppm (Example 4) and 160 ppm (Example 5), and the amounts of NMP contained relative to the mass of the aromatic polysulfone were respectively 10 mass % (Example 1), 3.6 mass % (Example 2), 1.8 mass % (Example 3), 1200 ppm (Example 4) and 160 ppm (Example 5). The results of evaluations of the heat resistance of the aromatic polysulfone compositions, the amounts of NMP contained in the molded articles and the results of evaluations of the mechanical properties are shown in Table 2.

Comparative Example 1

Some of the mixed precipitate obtained in Production Example 1 was sampled, repeatedly washed with water until NMP could no longer be observed in the mixed precipitate using the above-mentioned quantitative analysis method, then heated and dried at 150° C. to obtain an aromatic polysulfone composition not containing NMP. The results of evaluations of the heat resistance of the aromatic polysulfone composition and the mechanical properties of the molded article are shown in Table 2.

Comparative Example 2

The mixed precipitate obtained in Production Example 1 was washed repeatedly with water, then heated and dried at 150° C. to obtain an aromatic polysulfone composition. The amount of NMP contained in the resulting aromatic polysulfone composition was 15 mass %, and the amount of NMP that was contained relative to the mass of the aromatic polysulfone was 18 mass %. The results of evaluations of the heat resistance of the aromatic polysulfone composition, and the NMP content and the mechanical properties of the molded article are shown in Table 2.

Example 6

The mixed precipitate obtained in Production Example 1 was washed repeatedly with water in the same manner as in Comparative Example 1, then further washed with a 1 ppm NMP aqueous solution. The precipitate was then heated and dried at 150° C. to obtain an aromatic polysulfone composition. The amount of NMP contained in the resulting aromatic polysulfone composition was 12 ppm and the amount of NM P that was contained relative to the mass of the aromatic polysulfone was 12 ppm. The results of evaluations of the heat resistance of the aromatic polysulfone composition and the mechanical properties of the molded article are shown in Table 2.

For Example 1, the average value of three measurements is shown, for Example 3 and Comparative Example 1, the measurement values are shown, and for Examples 2 and 4 to 6 and Comparative Example 2, the average values of two measurements are shown.

TABLE 2

| | NMP Content Relative to Mass of Aromatic Polysulfone in Aromatic Polysulfone Composition | NMP Content Relative to Mass of Aromatic Polysulfone in Molded Article | Elasticity/ GPa | Stress/ MPa | Heat Resistance |
|---|---|---|---|---|---|
| Example 1 | 10 mass % | 1.3 mass % | 3.2 | 80.5 | b |
| Example 2 | 3.6 mass % | 93 ppm | 3.0 | 73.0 | a |
| Example 3 | 1.8 mass % | 140 ppm | 3.8 | 80.6 | a |
| Example 4 | 1200 ppm | 66 ppm | 3.3 | 82.4 | a |

TABLE 2-continued

|  | NMP Content Relative to Mass of Aromatic Polysulfone in Aromatic Polysulfone Composition | NMP Content Relative to Mass of Aromatic Polysulfone in Molded Article | Elasticity/ GPa | Stress/ MPa | Heat Resistance |
|---|---|---|---|---|---|
| Example 5 | 160 ppm | 35 ppm | 3.5 | 79.7 | a |
| Example 6 | 12 ppm | 9.6 ppm | 3.7 | 83.2 | a |
| Comparative Example 1 | not detected | — | 2.4 | 58.9 | a |
| Comparative Example 2 | 18 mass % | 3.3 mass % | 3.2 | 84.7 | c |

From the results in Table 2, the aromatic polysulfone compositions of Examples 1 to 6 contained at least 0.1 ppm and at most 10 mass % of NMP relative to the mass of the aromatic polysulfone, and thus had excellent heat resistance. The molded articles formed by molding these aromatic polysulfone compositions had excellent mechanical strength, with high elasticity, stress and the like.

In contrast to the above, the aromatic polysulfone composition of Comparative Example 1 did not contain NMP, and thus, molded articles formed by molding this aromatic polysulfone composition had poor mechanical strength.

In contrast to the above, the aromatic polysulfone composition of Comparative Example 2 contained 15 mass % of NMP relative to the mass of the aromatic polysulfone, and thus had poor heat resistance.

Based on the above results, it was verified that the present invention is useful.

INDUSTRIAL APPLICABILITY

The aromatic polysulfone composition of the present invention has excellent heat resistance, and molded articles produced using the aromatic polysulfone composition have high elasticity, stress and the like, and have excellent mechanical strength. Thus, the aromatic polysulfone composition of the present invention is useful.

The invention claimed is:

1. An aromatic polysulfone composition comprising:
an aromatic polysulfone; and
an organic compound having a boiling point no lower than 100° C. and no higher than 400° C.; wherein
the organic compound is contained in an amount of at least 0.1 ppm and at most 12 ppm relative to the mass of the aromatic polysulfone; and
the aromatic polysulfone has repeating units expressed by formula (1):

$$-Ph^1-SO_2-Ph^2-O- \quad (1)$$

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

2. The aromatic polysulfone composition according to claim 1, wherein the organic compound has, as Hansen solubility parameters, a dispersion parameter δD (units: $MPa^{0.5}$) of at least 16.0 and at most 22.0, a polarity parameter δP (units: $MPa^{0.5}$) of at least 12.0 and at most 16.4, and a hydrogen bonding parameter δH (units: $MPa^{0.5}$) of at least 3.0 and at most 12.0.

3. The aromatic polysulfone composition according to claim 1, wherein the organic compound is an aprotic polar solvent.

4. The aromatic polysulfone composition according to claim 1, wherein the organic compound is N-methyl-2-pyrrolidone.

5. A molded article comprising:
an aromatic polysulfone; and
an organic compound having a boiling point no lower than 100° C. and no higher than 400° C.; wherein
the organic compound is contained in an amount of at least 0.1 ppm and at most 9.6 ppm relative to the mass of the aromatic polysulfone; and
the aromatic polysulfone has repeating units expressed by formula (1):

$$-Ph^1-SO_2-Ph^2-O- \quad (1)$$

where, in formula (1), $Ph^1$ and $Ph^2$ represent phenylene groups, in which one or more hydrogen atoms that bind to the phenylene groups may, independently of each other, be substituted with an alkyl group having 1 to 10 carbon atoms, an aryl group having 6 to 20 carbon atoms, or a halogen atom.

* * * * *